No. 630,546.  
M. KRUSE.  
ENGRAVING MACHINE.  
(Application filed May 27, 1898.)  
(No Model.)  
Patented Aug. 8, 1899.
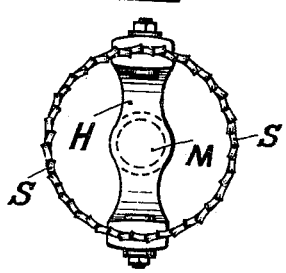
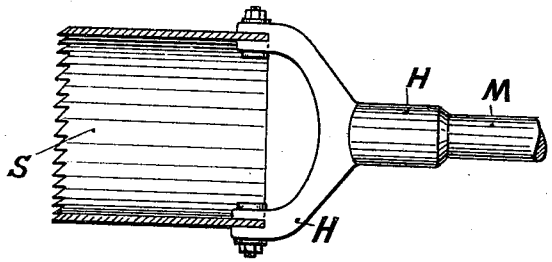
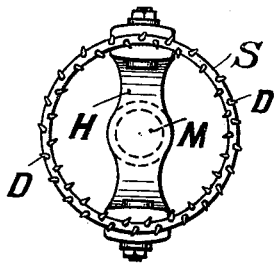
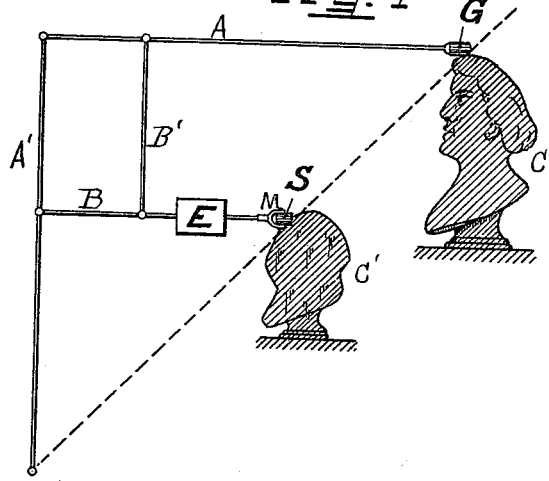
WITNESSES:
INVENTOR:  
Max Kruse,  
By Barton & Brown,  
Attorneys.

UNITED STATES PATENT OFFICE.

MAX KRUSE, OF WILMERSDORF, GERMANY.

ENGRAVING-MACHINE.

SPECIFICATION forming part of Letters Patent No. 630,546, dated August 8, 1899.

Application filed May 27, 1898. Serial No. 681,878. (No model.)

*To all whom it may concern:*

Be it known that I, MAX KRUSE, a subject of the German Emperor, residing at Wilmersdorf, near Berlin, in the German Empire, have invented a certain new and useful Improvement in Apparatus for Reproducing Sculptors' Models and Similar Articles, of which the following is a full, clear, concise, and exact description.

My invention relates to improvements in apparatus for copying or reproducing sculptors' models or similar articles and may be employed for more or less accurately shaping or cutting out the desired forms.

The device embodying my invention may be briefly described as consisting of a tracing part or point adapted to follow the original and mounted upon one arm of a pantograph, with which is connected in a well-known manner an actuated cutting-tool, (represented in the present device by a cylindrical saw device carrying abrading teeth or points,) which tool is driven by means of an electric motor.

My said invention will be more readily understood by reference to the accompanying drawings, wherein—

Figure 1 is vertical sectional view through one form of cutting-tool preferably employed in my device. Fig. 2 is an end view thereof. Fig. 3 is a similar view of a slightly-modified form of cutting-tool, and Fig. 4 is a somewhat diagrammatic view of the entire device.

The same letter of reference is used to designate like parts in all the figures of the drawings.

The cylindrical cutting tool or drill S is mounted at the end of the actuated arm B of the pantograph, which is pivotally secured in a well-known manner to the remaining arms A, A', and B', a mandrel M being provided at the end of arm B to receive a suitable tool. The arm A' is pivoted at its lower end to permit the free movement of the connected parts. The tool S is carried at the end of a forked arm H and is adapted to be driven by an electric motor E. The working part of the tool shown in the drawings is provided with teeth shaped like those of an ordinary saw, and this shape is preferred in those cases in which the material to be worked is wood or a similar substance. As usual in wood-saws, the alternate teeth are shown to be slightly bent inward and outward in order to prevent the tool from wedging or jamming in the material that is being worked. For accomplishing this purpose, however, well-known modifications may be employed in which the edge upon which the teeth are cut is slightly thicker than the back of the saw. When denser or harder materials than wood, such as marble or other kinds of stone, are to be worked, the several teeth of the tool preferably are studded with diamonds or equivalent cutting-points, as illustrated in Fig. 3, wherein the active cutting-points mounted upon tool S are represented by diamonds D D. Mounted at the end of the upper arm A is a tracing point or part G.

The utility and operation of my improved device will now be readily appreciated. The apparatus being mounted, as diagrammatically shown in Fig. 4, the tracing part or guide-piece G is placed upon the original article C to be copied, while the tool S is brought into engagement with the wooden or marble block to be operated upon. According to the character of work the part G is formed either with a blunt, cylindrical, or spherical head corresponding in size to the diameter of the tool S, and the same is moved over the surface of the model C, thereby causing the tool S to execute similar movements upon the surface of block C'. The tool, which is driven by an electric motor or any other suitable device, will serve to cut cylindrical portions out of the block, and by repeating this operation any desired degree of approximation to the shape of the original or model can be obtained.

Having now described apparatus embodying my invention, what I claim as new, and desire to secure by these Letters Patent, is—

In apparatus of the class described, the combination with the pivoted pantograph-arms A A' and B B', of a tracing part G mounted upon the arm A, a cutting-tool S consisting of a hollow cylindrical saw device provided with abrading-teeth upon its outer rim and mounted upon the arm B, and means for rotating the cylindrical saw device at a high speed, substantially as and for the purpose specified.

In witness whereof I have hereunto subscribed my name this 10th day of May, A. D. 1898.

MAX KRUSE.

Witnesses:
 C. H. DAY,
 HENRY HASPER.